United States Patent
Wahl

[15] 3,686,584
[45] Aug. 22, 1972

[54] GAS LASER HAVING A CAPILLARY TUBE WITH A CONTRACTED PORTION THAT SERVES AS A MODE SELECTOR

[72] Inventor: Hermann Wahl, Krailling, Germany

[73] Assignee: Siemens Aktiengesellschaft, Berlin and Munich, Germany

[22] Filed: Dec. 2, 1970

[21] Appl. No.: 94,415

[30] Foreign Application Priority Data

Dec. 11, 1969  Germany..........P 19 62 201.6

[52] U.S. Cl.............................................331/94.5
[51] Int. Cl....................................................H01s 3/00
[58] Field of Search....................................331/94.5

[56] References Cited

UNITED STATES PATENTS

| | | |
|---|---|---|
| 3,486,058 | 12/1969 | Herngvist..............331/94.5 X |
| 3,395,366 | 7/1968 | Snitzer et al...............331/94.5 |
| 3,187,270 | 6/1965 | Kogelnik et al...........331/94.5 |
| 3,428,914 | 2/1969 | Bell...........................331/94.5 |
| 3,503,004 | 3/1970 | Haisma et al..............331/94.5 |
| 3,510,796 | 5/1970 | Ahsmann...................331/94.5 |

*Primary Examiner*—Ronald L. Wibert
*Assistant Examiner*—Edward S. Bauer
*Attorney*—Hill, Sherman, Meroni, Gross & Simpson

[57] ABSTRACT

A gas laser of the type including a discharge tube closed at its opposite ends by Brewster windows or mirrors and having a laser-active medium contained therein is characterized by the discharge tube having a central, capillary tube portion formed with a contracted section having an internal bore. The contracted section has a small axial extent with respect to the capillary tube portion and is formed with an optimum internal diameter for producing a gas laser which operates in a desired mode.

5 Claims, 1 Drawing Figure

Patented Aug. 22, 1972   3,686,584
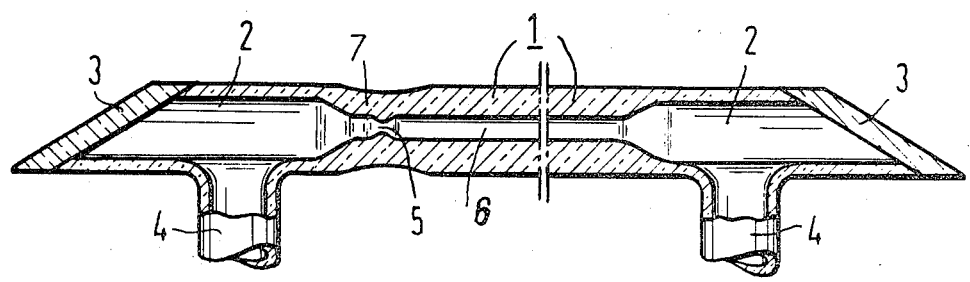
INVENTOR
Hermann Wahl
BY
ATTYS.

GAS LASER HAVING A CAPILLARY TUBE WITH A CONTRACTED PORTION THAT SERVES AS A MODE SELECTOR

BACKGROUND OF THE INVENTION

1. Field of the Invention

The present invention generally relates to gas lasers of the type having a discharge tube disposed between a pair of reflectors and having opposite end portions closed by Brewster windows to form a closed tube for containing a laser-active medium. In particular, the present invention refers to a discharge tube which includes a capillary tube portion.

2. Description of the Prior Art

For gas lasers that are not designed exclusively as processing lasers, it is desirable that the laser oscillates only in a single mode, the basic mode, if possible. In lasers of the type including a discharge tube having a capillary tube portion, the selection of that desired mode depends upon the diameter of the capillary tube portion and a resonator mirror, as well as upon the resonator quality. The values of the variable parameters determined by theoretical calculations are not always accurate, due to their dependence upon the practically non-determinable resonator quality.

Additionally, in order to obtain oscillation in the desired mode, the diameter of the capillary tube portion must have a precise value with acceptable tolerances in the order of a few tenths, and even up to only a few thousands of a millimeter over the entire axial length of the capillary tube portion. Heretofore, the production of discharge tubes having the required or optimum diameter over their entire length has been, at best, difficult, thereby resulting in a high rate of waste.

SUMMARY OF THE INVENTION

In accordance with the present invention, a discharge tube for a gas laser is constructed with a configuration that materially lessens the criticality of a diameter of a capillary tube portion and enables convenient correction of the capillary tube portion, when the same is out of tolerance. The diameter of the capillary tube portion, among other things, influences the mode at which the gas laser oscillates. Thus, the proper selection of the mode at which the gas laser operates depends upon the capillary tube, or a portion thereof, having an optimum internal diameter.

The object of this invention is accomplished by forming the discharge tube with a locally contracted portion in the region of the capillary tube. The contracted portion has a substantially lesser axial extent than that of the capillary tube portion, thereby facilitating production of a capillary tube having an internal diameter that is within acceptable tolerances.

The discharge tube of the present invention has an internal through bore including the capillary tube portion, which is centrally disposed, and shorter bore sections formed with a larger diameter than that of the capillary tube portion. The shorter tube sections have their open ends closed by Brewster windows or integrated mirrors, and if desired, laterally extending branches on the discharge tube may be formed to open into the larger diametered sections of the discharge tube through bore.

Also, the contracted sections are preferably disposed near one end of the capillary tube section, rather than centrally therein.

It is contemplated by this invention that the contracted section may advantageously be produced by inserting a sized pin into the capillary bore and then locally heating the discharge tube. The heated portion of the discharge tube then may be shrunk onto the sized pin or stretched in a manner to reduce the diameter of the capillary bore, at the heated section, to that of the pin.

BRIEF DESCRIPTION OF THE DRAWING

The drawing is a longitudinal sectional view of a discharge tube, constructed in accordance with the present invention, for a gas laser. Portions of the gas laser, such as resonator mirrors and discharge electrodes, which are not essential to an understanding of the present invention, have been omitted from the drawing for clarity.

DETAILED DESCRIPTION OF A PREFERRED EMBODIMENT

Referring to the drawing, a discharge tube 1 for use in a gas laser includes a glass or quartz tube having a central through bore. The through bore has a centrally disposed capillary tube portion 6 flanked by larger diametered end sections 2, 2, with the capillary tube portion extending over the largest portion of the discharge tube length. A pair of so-called Brewster windows or mirrors 3, 3 close opposite end portions of the central bore of the discharge tube 1, thereby enabling a laser-active medium to be contained within the discharge tube. If desired, lateral studs or branches, as at 4, 4 may be formed in the discharge tube 1 at positions to open into the enlarged end sections 2, 2. The lateral branches may accommodate discharge electrodes.

In order to provide a discharge tube for use in a gas laser which oscillates in a desired mode, the internal diameter of the capillary tube portion 6 must be precisely sized. In accordance with the present invention, the discharge tube 1 is initially formed with the capillary tube portion 6 having an internal diameter at least slightly greater than the optimum diameter for the desired mode of the oscillations. Thus, the criticality of the tolerances on the diameter of the capillary tube portion 6 is greatly reduced over that heretofore required.

It is contemplated by the present invention to form the discharge tube 1 with a locally contracted or reduced portion 7 formed with an internal bore 5 extending coaxially of the capillary tube bore. The contracted portion 7 and its internal bore 5 have a substantially lesser axial extent than that of the capillary tube portion 6. According to this invention, the internal diameter of the bore 5 of the contracted portion 7 is precisely sized to provide a discharge tube which operates in the desired mode. Thus, a gas laser utilizing the discharge tube 1 includes what may be termed an integrated mode screen, as opposed to the prior art devices which included an adjustable outer mode screen. Thus, the arrangement of the present invention eliminates the necessity for a mode screen, which heretofore has been applied to enable proper mode selection, in the event the desired mode was not accomplished by the dimensioning of the capillary tube and the quality of the mirrors.

Also, in accordance with the present invention, the precise dimensioning of the contracted bore portion 5 is accomplished by inserting a sizing or fitting pin, preferably composed of steel or an equivalent, axially into the capillary tube portion. That sizing pin is formed with an outer diameter corresponding to the optimum diameter which has been empirically determined for producing a gas laser which operates in the desired mode. After the sizing pin has been inserted, the discharge tube 1 is locally heated in the area to be contracted, and then the tube is either shrunk onto or stretched onto the fitting pin. In that manner, the contracted portion 7 is formed with the optimum internal diameter dependent upon the outer diameter of the sizing pin. Subsequent to the contracting operation, the sizing pin is withdrawn.

Although those versed in the art might suggest various minor modifications, it should be understood that we wish to embody within the patent warranted hereon all such modifications as reasonably and properly come within the scope of my contribution to the art.

I claim as my invention:

1. A method of forming a discharge tube for a gas laser comprising the steps of providing a glass tube having an internal through bore formed with a centrally disposed capillary tube portion and larger diametered end sections; and inserting a precisely sized pin axially into the capillary tube portion, said pin having an outer diameter which will produce a gas laser discharge tube that oscillates in a predetermined mode; locally heating the tube radially outwardly of the inserted pin in the region of the capillary tube portion; and shrinking the tube at the heated region onto the pin and then withdrawing the pin to form a contracted portion having an internal bore formed with a diameter depending upon the outer diameter of the sizing pin.

2. In a gas laser, a discharge tube having an internal through bore formed with a centrally disposed capillary portion and larger diametered outer, opposed end sections, the improvement of the capillary tube portion having an internal diameter larger than an optimum diameter for producing a discharge tube for a gas laser that oscillates at a predetermined mode; and a contracted portion forming an internal bore substantially coaxial of the capillary tube portion and being of an optimum, empirically determined diameter for producing a discharge tube for use in a gas laser that oscillates at the predetermined mode.

3. In a gas laser, a discharge tube according to claim 2, said contracted portion having an axial extent substantially less than the axial extent of the capillary tube portion and being disposed near one end thereof.

4. A gas laser operable at a predetermined mode comprising a gas filled discharge tube having a central bore therethrough with said bore having opposite ends sections closed by windows set at Brewster's angle, said tube including a capillary section intermediate said opposite end sections having an internal bore diameter less than that of said opposite end section and slightly greater than the diameter which will produce the optimum value of the predetermined mode, said capillary section having a contracted portion at which said central bore has a diameter which will produce the optimum value of the predetermined mode.

5. A gas laser according to claim 9 wherein said contracted portion is disposed adjacent one of said opposite end sections.

* * * * *